US012792590B2

(12) United States Patent
Chauhan et al.

(10) Patent No.: US 12,792,590 B2
(45) **Date of Patent: *Nov. 10, 2026**

(54) DATA INTEGRITY OPTIMIZATION

(71) Applicant: Google LLC, Mountain View, CA (US)

(72) Inventors: Satvik Chauhan, Campbell, CA (US); Riyana Basu, Mountain View, CA (US); Lianxiao Qiu, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 23 days.

This patent is subject to a terminal disclaimer.

(21) Appl. No.: 18/890,146

(22) Filed: Sep. 19, 2024

(65) Prior Publication Data

US 2025/0013630 A1 Jan. 9, 2025

Related U.S. Application Data

(63) Continuation of application No. 17/927,088, filed as application No. PCT/US2020/047407 on Aug. 21, 2020, now Pat. No. 12,130,799.

(51) Int. Cl.
*G06F 16/20* (2019.01)
*G06F 16/23* (2019.01)
*G06F 16/26* (2019.01)

(52) U.S. Cl.
CPC .......... *G06F 16/2365* (2019.01); *G06F 16/26* (2019.01)

(58) Field of Classification Search
CPC ............................. G06F 16/2365; G06F 16/26
(Continued)

(56) References Cited

U.S. PATENT DOCUMENTS 6,771,290 B1 * 8/2004 Hoyle ........................ G06F 9/00 717/170
7,366,996 B2 * 4/2008 Hoyle ................ G06Q 30/0251 715/745

(Continued)

FOREIGN PATENT DOCUMENTS

JP 2017-502393 1/2017
WO WO 01/44988 A1 * 6/2001
WO WO 200144988 6/2001

OTHER PUBLICATIONS

Office Action in Chinese Appln. No. 202080026760.3, mailed on Apr. 15, 2025, 18 pages (with English translation).

(Continued)

*Primary Examiner* — Daniel A Kuddus
(74) *Attorney, Agent, or Firm* — Fish & Richardson P.C.

(57) ABSTRACT

A method includes receiving interaction data indicating a performance of a specified action by a user of a user device, identifying a last-in-time action associated with the user and an initiation action associated with the user and the specified action, generating, based on the identified last-in-time and initiation actions, a first attribution associated with the identified last-in-time action and the specified action and a second, additional attribution associated with the identified initiation action and the specified action, propagating, to two or more different models, the first attribution and the second, additional attribution, and generating, based on the first attribution and the second, additional attribution, one or more visual representations of the first attribution and the second, additional attribution.

20 Claims, 4 Drawing Sheets

(58) Field of Classification Search
USPC ........ 707/690, 713, 692, 717, 725, 793, 771
See application file for complete search history.

(56) References Cited

U.S. PATENT DOCUMENTS

| | | | | |
|---|---|---|---|---|
| 7,685,537 | B2 * | 3/2010 | Hoyle | G06F 9/00 715/765 |
| 8,250,150 | B2 | 8/2012 | Beck et al. | |
| 11,604,799 | B1 * | 3/2023 | Bigdelu | G06F 3/0484 |
| 2002/0129129 | A1 * | 9/2002 | Bloch | H04L 67/02 709/218 |
| 2002/0178232 | A1 * | 11/2002 | Ferguson | G06Q 30/0251 709/217 |
| 2007/0033187 | A1 * | 2/2007 | Friedman | G06F 11/3438 |
| 2008/0288874 | A1 * | 11/2008 | Hoyle | G06Q 30/0269 715/738 |
| 2009/0288012 | A1 | 11/2009 | Hertel et al. | |
| 2010/0174606 | A1 * | 7/2010 | Hoyle | G06F 8/65 705/14.52 |
| 2011/0145049 | A1 | 6/2011 | Hertel et al. | |
| 2011/0208582 | A1 * | 8/2011 | Hoyle | G06F 8/60 705/14.49 |
| 2012/0158512 | A1 * | 6/2012 | Hoyle | G06F 9/30 705/14.66 |
| 2013/0013410 | A1 * | 1/2013 | Hoyle | G06Q 30/02 705/14.54 |
| 2015/0127467 | A1 * | 5/2015 | Hoyle | G06Q 30/0251 705/14.66 |
| 2015/0186532 | A1 | 7/2015 | Agarwal et al. | |
| 2016/0283923 | A1 | 9/2016 | Hertel et al. | |
| 2016/0300196 | A1 * | 10/2016 | Guido | G06Q 20/10 |
| 2018/0183891 | A1 | 6/2018 | Zhang et al. | |
| 2019/0180357 | A1 * | 6/2019 | Arora | G06F 16/951 |
| 2020/0128097 | A1 | 4/2020 | Zhang et al. | |
| 2020/0242450 | A1 * | 7/2020 | Tang | G06Q 30/0271 |

OTHER PUBLICATIONS

Developers.facebook.com [online], "Optimize Your App Ad" Aug. 2019, retrieved on Jan. 26, 2023, retrieved from URL <https://developers.facebook.com/docs/app-ads/optimizing-your-app-ad>, 10 pages.

International Preliminary Report on Patentability in International Appln. No. PCT/US2020/047407, mailed on Mar. 2, 2023, 8 pages.

International Search Report and Written Opinion in International Appln. No. PCT/US2020/047407, mailed on Apr. 12, 2021, 13 pages.

Notice of Allowance in Japanese Appln. No. 2021-559673, mailed on Jan. 10, 2023, 5 pages (with English translation).

Support.appsflyer.com [online], "Retargeting attribution guide" Oct. 2017, retrieved on Jan. 26, 2023, retrieved from URL <https://support.appsflyer.com/hc/en-us/articles/207033786-AppsFlyer-s-Re-Targeting-Attribution#retargeting-page-lifetime-value-ltv-analysis-for-retargeting-campaigns>, 2 pages.

* cited by examiner

DATA INTEGRITY OPTIMIZATION

CROSS-REFERENCE TO RELATED APPLICATIONS

This application is a continuation application and claims priority under 35 U.S.C. § 120 to U.S. patent application Ser. No. 17/927,088, filed on Nov. 22, 2022, which is a National Stage Application under 35 U.S.C. § 371 and claims the benefit of International Application No. PCT/US2020/047407, filed on Aug. 21, 2020. The disclosures of the prior applications are considered part of and are incorporated by reference in the disclosure of this application.

BACKGROUND

This specification relates to data processing and preserving data integrity when collecting and analyzing user data for the purposes of modelling.

SUMMARY

In general, one innovative aspect of the subject matter described in this specification can be embodied in a method that includes receiving, by one or more processors, interaction data indicating a performance of a specified action by a user of a user device, identifying, by the one or more processors, a last-in-time action associated with the user and an initiation action associated with the user and the specified action, generating, by the one or more processors and based on the identified last-in-time action and the identified initiation action, a first attribution associated with the identified last-in-time action and the specified action and a second, additional attribution associated with the identified initiation action and the specified action, propagating, by the one or more processors and to two or more different models, the first attribution and the second, additional attribution, and generating, by the one or more processors and based on the first attribution and the second, additional attribution, one or more visual representations of the first attribution and the second, additional attribution.

In some implementations, the one or more visual representations include a first visual representation of the first attribution and a second, different visual representation of the second, additional attribution. In some implementations, the second, different visual representation of the second, additional attribution is visually distinct from the first visual representation of the first attribution.

In some implementations, identifying the last-in-time action associated with the user and the initiation action associated with the user and the specified action comprises querying one or more interaction databases.

In some implementations, the specified action comprises providing user input through a user interface element.

In some implementations, the initiation action comprises downloading and installing an application on the user device.

In some implementations, the method includes determining, by the one or more processors, that the identified initiation action occurred within a predetermined period of time prior to the occurrence of the specified action.

Systems using different models can experience discrepancies that arise from the models having access to different sets of data. For example, some systems may lose or fail to collect data that should be analyzed when those systems use multiple models and one model can access data that another model cannot access. This loss of data can lead to discrepancies, particularly when only one of the models is able to collect a particular kind of data, leading to incorrect predictions from another model due to the lost or inaccessible data. The following description discusses techniques for preserving data integrity by ensuring that data is provided to or accessible by particular models to improve the accuracy of the models individually and the system as a whole. Additionally, the techniques ensure that data is replicated to the appropriate system so as to improve the accuracy of the models and prevent data loss.

Particular embodiments of the subject matter described in this specification can be implemented to realize one or more of the following advantages. For example, the solutions described in this specification also reduce data integrity issues by preventing inaccuracies from being propagated. In other words, the improved method provides one model with the same data provided to another model such that the data used across the models are consistent. Additionally, the methods improve the accuracy of models by collecting and analyzing a more representative and complete set of data than previously used. In other words, the improved method allows a model to account for new factors that were not considered before. Furthermore, the method expands the universe of feedback available to a model. For example, whereas models such as content selection models generally use the most recent activity data of a particular type as feedback, the techniques described in this specification allow those models to use other types of data and/or data from a broader window of time, such as activity that occurred within a predetermined period of time prior to the present time.

By improving the accuracy of these models, the computer reduces the amount of processing required to provide content that is unlikely to be of interest to a user or to influence a user to take a particular action. Furthermore, by preventing inaccurate or incomplete data and/or results from being propagated, the methods improve the efficiency of a system that processes the models by reducing the number of processing cycles required to achieve an accurate result.

The methods also provide a visual indication of data that was not previously considered or made available to a particular model. By emphasizing data that has been added, the methods allow a user to quickly and easily identify new data and any effects the data has when included in the models.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
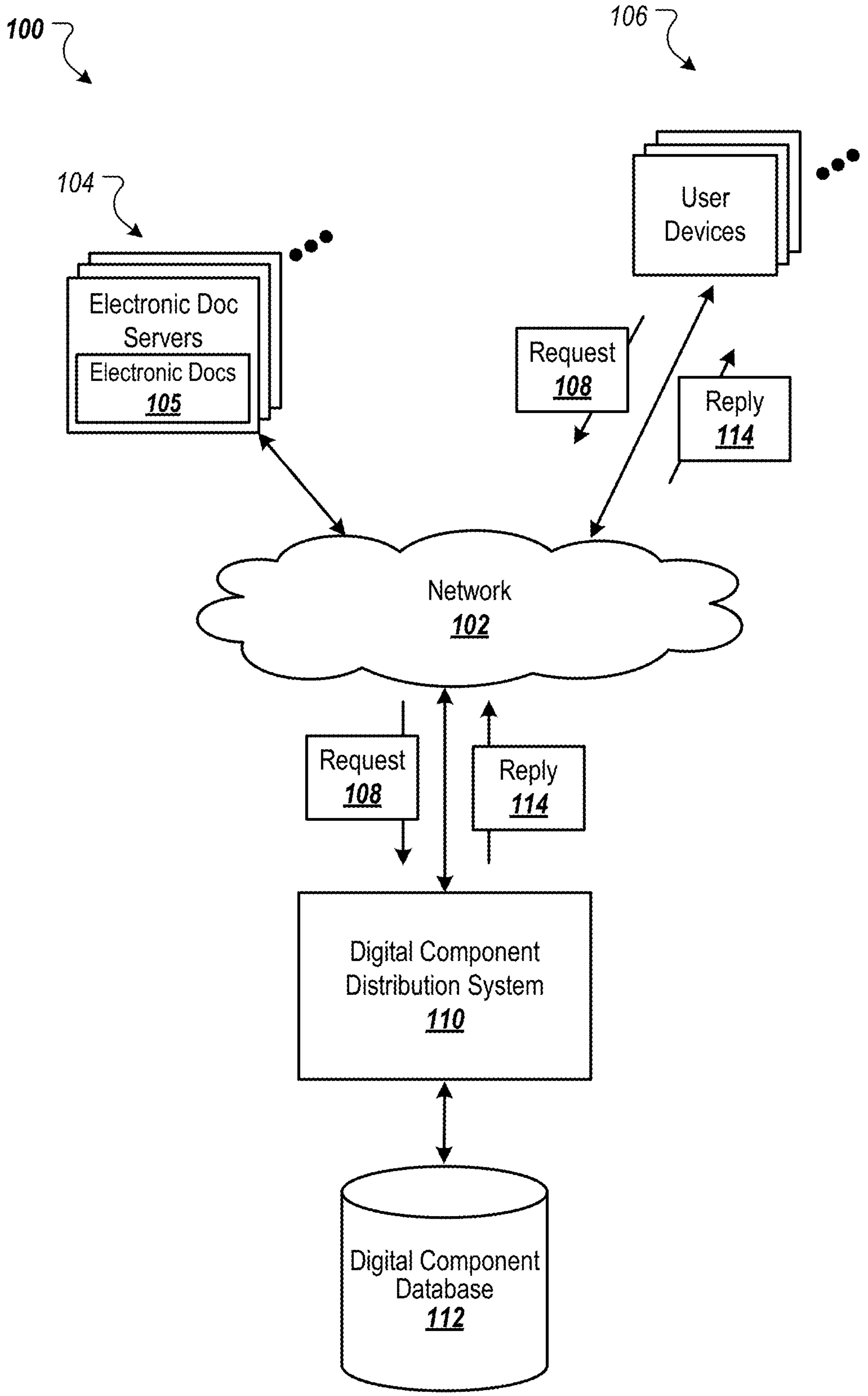
FIG. 1 is a block diagram of an example environment for optimizing data integrity during data collection and analysis.

This disclosure relates to computer implemented methods and systems that optimize data integrity when collecting and analyzing user data.

Through the exchange of information and transactions between users and content providers, a provider may receive user data, such as, for example, the types of content that the user accesses, when the user last accessed the provider's website, and other information related to the user's interactions with the provider and/or the provider's website. For purposes of the description herein, "content" refers to digital content, including third party content provided by content providers. A content item refers to a particular piece of content, and includes digital components for presentation with other content requested by a user. Systems that distribute content to users may select content based on models that predict, among other factors, how relevant a content item will be to a particular user and how likely the user is to interact with the content. In some situations, systems use multiple models, but the models do not share data sets. Instead, the models are trained using specific sets of data that are not representative of all factors. For example, some models may not have access to particular sets of data, and may be trained using data sets that are incomplete. Models using incomplete data sets would produce inaccuracies as compared to models using more complete data sets, and continuing to use the results of these models in subsequent modelling (such as input to other models or as feedback to the model itself) only serves to propagate the inaccuracies. Existing methods do not account for particular types of missing data, and either do not collect or do not have access to data that can improve the accuracy of the models. As described in detail throughout this specification, the innovative techniques herein allow for techniques that improve data integrity in particular systems that use multiple models with access to differing sets of data.

Further to the descriptions throughout this document, a user may be provided with controls allowing the user to make an election regarding both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 1 is a block diagram of an example environment 100 for optimizing data integrity during data collection and analysis. The example environment 100 includes a network 102, such as a local area network (LAN), a wide area network (WAN), the Internet, or a combination thereof. The network 102 connects electronic document servers 104 ("Electronic Doc Servers"), user devices 106, a digital component distribution system 110 (also referred to as DCDS 110), and a privacy server 120. The example environment 100 may include many different electronic document servers 104 and user devices 106.

A user device 106 is an electronic device that is capable of requesting and receiving resources (e.g., electronic documents) over the network 102. Example user devices 106 include personal computers, wearable devices, smart speakers, tablet devices, mobile communication devices (e.g., smart phones), smart appliances, and other devices that can send and receive data over the network 102. In some implementations, the user device can include a speaker that outputs audible information to a user, and a microphone that accepts audible input (e.g., spoken word input) from the user. The user device can also include a digital assistant that provides an interactive voice interface for submitting input and/or receiving output provided responsive to the input. The user device can also include a display to present visual information (e.g., text, images, and/or video). A user device 106 typically includes a user application, such as a web browser, to facilitate the sending and receiving of data over the network 102, but native applications executed by the user device 106 can also facilitate the sending and receiving of data over the network 102.

An electronic document is data that presents a set of content at a user device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents 105 ("Electronic Docs") can be provided to user devices 106 by electronic document servers 104. For example, the electronic document servers 104 can include servers that host publisher websites. In this example, the user device 106 can initiate a request for a given publisher webpage, and the electronic document server 104 that hosts the given publisher webpage can respond to the request by sending machine Hyper-Text Markup Language (HTML) code that initiates presentation of the given webpage at the user device 106.

Electronic documents can include a variety of content. For example, an electronic document 105 can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the user device 106 to request content from the data source when the given electronic document is processed (e.g., rendered or executed) by a user device 106. The user device 106 integrates the content obtained from the data source into a presentation of the given electronic document to create a composite electronic document including the content obtained from the data source.

In some situations, a given electronic document can include a digital content tag or digital content script that references the DCDS 110. In these situations, the digital content tag or digital content script is executed by the user device 106 when the given electronic document is processed by the user device 106. Execution of the digital content tag or digital content script configures the user device 106 to generate a request 108 for digital content, which is transmitted over the network 102 to the DCDS 110. For example, the digital content tag or digital content script can enable the user device 106 to generate packetized data request including a header and payload data. The request 108 can include data such as a name (or network location) of a server from which the digital content is being requested, a name (or network location) of the requesting device (e.g., the user device 106), and/or information that the DCDS 110 can use to select digital content provided in response to the request.

The request 108 is transmitted, by the user device 106, over the network 102 (e.g., a telecommunications network) to a server of the DCDS 110.

The request 108 can include data that specifies the electronic document and characteristics of locations at which digital content can be presented. For example, data that specifies a reference (e.g., URL) to an electronic document (e.g., webpage) in which the digital content will be presented, available locations (e.g., digital content slots) of the electronic documents that are available to present digital content, sizes of the available locations, positions of the available locations within a presentation of the electronic document, and/or media types that are eligible for presentation in the locations can be provided to the DCDS 110. Similarly, data that specifies keywords designated for the selection of the electronic document ("document keywords") or entities (e.g., people, places, or things) that are referenced by the electronic document can also be included in the request 108 (e.g., as payload data) and provided to the DCDS 110 to facilitate identification of digital content items that are eligible for presentation with the electronic document.

Requests 108 can also include data related to other information, such as information that the user has provided, geographic information that indicates a state or region from which the request was submitted, or other information that provides context for the environment in which the digital content will be displayed (e.g., a type of device at which the digital content will be displayed, such as a mobile device or tablet device). User-provided information can include demographic data for a user of the user device 106. For example, demographic information can include age, gender, geographical location, education level, marital status, household income, occupation, hobbies, social media data, and whether the user owns a particular item, among other characteristics.

Data that specifies characteristics of the user device 106 can also be provided in the request 108, such as information that identifies a model of the user device 106, a configuration of the user device 106, or a size (e.g., physical size or resolution) of an electronic display (e.g., touchscreen or desktop monitor) on which the electronic document is presented. Requests 108 can be transmitted, for example, over a packetized network, and the requests 108 themselves can be formatted as packetized data having a header and payload data. The header can specify a destination of the packet and the payload data can include any of the information discussed above.

The DCDS 110 selects digital content that will be presented with the given electronic document in response to receiving the request 108 and/or using information included in the request 108. In some implementations, the DCDS 110 is implemented in a distributed computing system (or environment) that includes, for example, a server and a set of multiple computing devices that are interconnected and identify and distribute digital content in response to requests 108. The set of multiple computing devices operate together to identify a set of digital content that is eligible to be presented in the electronic document from among a corpus of millions or more of available digital content. The millions or more of available digital content can be indexed, for example, in a digital component database 112. Each digital content index entry can reference the corresponding digital content and/or include distribution parameters (e.g., selection criteria) that condition the distribution of the corresponding digital content.

The identification of the eligible digital content can be segmented into multiple tasks that are then assigned among computing devices within the set of multiple computing devices. For example, different computing devices can each analyze a different portion of the digital component database 112 to identify various digital content having distribution parameters that match information included in the request 108.

The DCDS 110 aggregates the results received from the set of multiple computing devices and uses information associated with the aggregated results to select one or more instances of digital content that will be provided in response to the request 108. In turn, the DCDS 110 can generate and transmit, over the network 102, reply data 114 (e.g., digital data representing a reply) that enables the user device 106 to integrate the select set of digital content into the given electronic document, such that the selected set of digital content and the content of the electronic document are presented together at a display of the user device 106.

Figure 2:
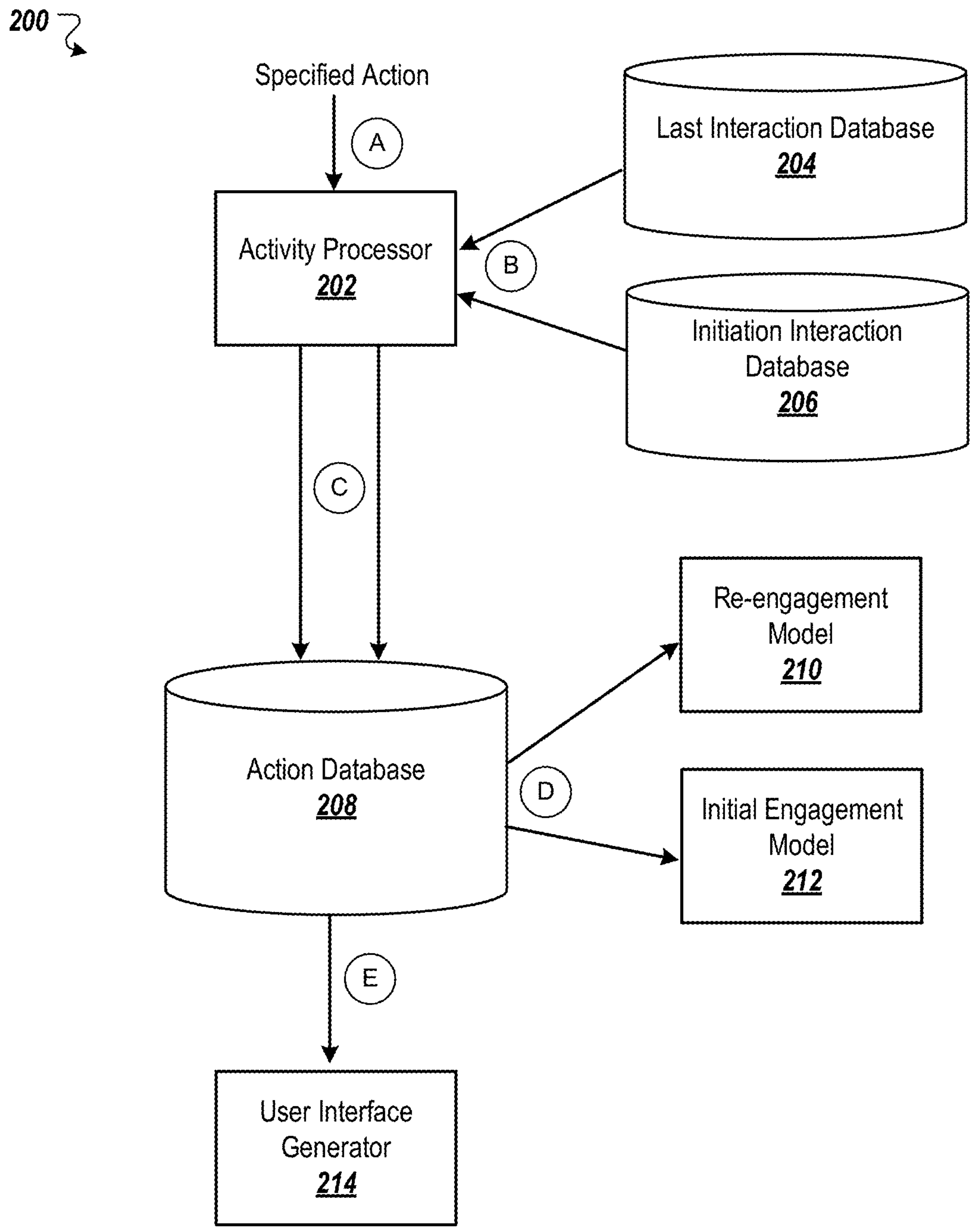
FIG. 2 depicts a data flow of a method for improving data integrity in modelling.

FIG. 2 is a data flow diagram of a method 200 for data collection and analysis. Operations of method 200 are performed by various components of the system 100. For example, operations of method 200 can be performed by components of DCDS 110 in communication with user device 106, including activity processor 202, last interaction database 204, initiation interaction database 206, action database 208, re-engagement model 210, initial engagement model 212, and user interface generator 214. These components of DCDS 110 can be implemented as physical subsystems and/or software modules.

The method 200 encapsulates the above described data integrity improvements, and enables models within content distribution systems to analyze information that is not typically made available to such models. Furthermore, the method 200 allows a content distribution system to arrive at a more accurate result when evaluating factors that influence a user's actions.

When multiple, different content campaigns that have differing parameters are run in parallel, it becomes more difficult to distinguish the effects of one campaign from the effects of another. If data that reflects the effects of one campaign are not gathered and/or analyzed, those effects can be incorrectly recorded or attributed to another campaign, or lost entirely.

The method 200 describes a process through which data quantifying the effects of particular campaigns can be collected and stored for use in models that did not previously have access to such data, thereby improving the accuracy and consistency of the model.

Activity processor 202 can detect and process user actions. Activity processor 202 can receive user interaction data and determine, based on the received data, that a particular action has occurred. In some implementations, activity processor 202 can also receive data indicating that a particular action has occurred. The particular action can be, for example, a conversion event. A conversion event is a user action that is desired and/or specified by an entity such as a content provider. Conversion events can include, for example, navigating to a particular page, completing a purchase, interacting with a particular user interface element, downloading a particular content item, installing a particular program or application, etc. For example, activity processor 202 can receive user interaction data and determine, based on the received data, that the user has completed a purchase of a life in a game application, such as an application run on user device 106. The particular action can be specified by a content provider, by the application, by the DCDS 110, among other entities. For example, a content provider that provides content items that are distributed by DCDS 110 to user devices 106 can specify a particular action to be performed by a user that action processor 202 is configured to detect.

Last interaction database 204 maintains a set of last-in-time interactions. In some implementations, last interaction database 204 indexes each interaction. In some implementations, last interaction database 204 stores an identifier or reference to each interaction. Each of these interactions is the most-recently occurring interaction associated with a particular user of user device 106. For example, a last-in-time interaction can be a click on a link that loads an application, where loading the application is the particular action that activity processor 202 is configured to detect. The interaction data can indicate, for example, the type of interaction, the associated address of a website or application through which the interaction was performed, the user associated with the action, the user device associated with the action, a time and date of the interaction, or the interaction that occurred prior to the current interaction, among other information associated with an interaction. The interactions can be indexed, for example, according to the user or the user device 106, according to the time at which the interaction occurred, or according to the type of interaction, among other attributes by which the interactions can be indexed.

Initiation interaction database 206 maintains a set of initiation interactions. Each of these initiation interactions is an interaction recorded as the interaction associated with a user performing an initiation action related to the specified action that activity processor 202 has detected. Initiation actions can include downloading and installing an application. For example, an initiation interaction can be an interaction to which the action of a particular user of user device 106 downloading and installing an online shopping application is attributed. In some implementations, initiation interaction database 206 indexes each interaction. In some implementations, initiation interaction database 206 stores an identifier or reference to each interaction. The interaction data can indicate, for example, the type of interaction, the associated address of a website or application through which the interaction was performed, the user associated with the action, the user device associated with the action, a time and date of the interaction, or the interaction that occurred prior to the current interaction, among other information associated with an interaction. The interactions can be indexed, for example, according to the user or the user device 106, according to the time at which the interaction occurred, or according to the type of interaction, among other attributes by which the interactions can be indexed.

Action database 208 maintains a set of actions, such as actions that are listed as particular actions that activity processor 202 is configured to detect. The set of actions includes specified actions for which last interactions as stored in last interaction database 204 and initiation interactions as stored in initiation database 206 are recorded and to which the actions can be attributed. As discussed above, the actions can be specified by entities, including content providers. In some implementations, each content distribution system, such as DCDS 110, maintains its own action database.

Re-engagement model 210 is a model that predicts the likelihood and/or efficacy of particular campaigns to influence a user's actions after a user has performed an initiation action. For example, re-engagement model 210 considers data for interactions taken after a user has performed an action such as downloading and installing a game application.

Initial engagement model 212 is a model that predicts the likelihood and/or efficacy of particular campaigns to influence a user to perform an initiation action. For example, initial engagement model 212 considers data for interactions taken directly before a user has performed an action such as downloading and installing a navigation application.

Re-engagement model 210 and initial engagement model 212 can use for example, artificial intelligence and machine learning techniques to predict the likelihood and/or efficacy of particular campaigns. Re-engagement model 210 and initial engagement model 212 can use the predicted likelihoods to generate, for example, values to be associated with each campaign.

Re-engagement model 210 and initial engagement model 212 can use statistical and/or machine learning models that accept user-provided information as inputs. The machine learning models may use any of a variety of models such as decision trees, generative adversarial network-based models, deep learning models, linear regression models, logistic regression models, neural networks, classifiers, support vector machines, inductive logic programming, ensembles of models (e.g., using techniques such as bagging, boosting, random forests, etc.), genetic algorithms, Bayesian networks, etc., and can be trained using a variety of approaches, such as deep learning, association rules, inductive logic, clustering, maximum entropy classification, learning classification, etc. In some examples, the machine learning models may use supervised learning. In some examples, the machine learning models use unsupervised learning.

User interface generator 214 generates a user interface that displays the particular action and attribution data provided to re-engagement model 210 and initial engagement model 212. For example, user interface generator 214 can generate a user interface for a user of system 100 to review changes in data provided to models 210 and 212. User interface generator 214 can highlight data provided to models 210 and 212 that are not usually provided, allowing a user to quickly identify information that is new.

The method 200 begins with step A, in which activity processor 202 receives interaction data associated with a specified action, such as leaving a review regarding a set of directions provided by a navigation application. In another example, the interaction data can indicate loading an application or user input of data. Activity processor 202 can detect, based on the interaction data, that the specified action has occurred.

The method 200 continues with step B, in which activity processor 202 accesses last interaction database 204 and initiation interaction database 206. Activity processor 202 can retrieve the last interaction with which the user of user device 106 is associated in last interaction database 204. For example, activity processor 202 can access the last interaction associated with the user of user device 106 from last interaction database 204, a click on a suggested action to review a restaurant they visited yesterday. Additionally, in contrast to existing methods for modelling campaign efficacy that only consider the last-in-time interaction, or the interaction performed immediately prior to the specified action, activity processor 202 also considers the initiation interaction with which the user of user device 106 is associated in initiation interaction database 204. For example, activity processor 202 can access the initiation interaction associated with the user of user device 106 and the specified action detected by activity processor 202 in step A, a suggested link to download and install a navigation application. By considering this additional initiation data, method 200 improves the accuracy of any subsequent modelling due to the inclusion of interactions that can have an effect on the results of the modelling that was not previously accounted for.

The method 200 continues with step C, in which activity processor 202 generates two instances of attribution and provides the instances of attribution to action database 208. One instance of attribution is associated with the specified action and the last interaction action retrieved from last interaction database 204. The other instance of attribution is associated with the specified action and the initiation action retrieved from initiation interaction database 206. Action database 208 maintains the instances of attribution and the specified action.

In contrast to existing methods in which only one instance of attribution is recorded, the method 200 allows data that is not collected or provided for analysis to also be recorded, improving data integrity and the accuracy of re-engagement model 210 and initial engagement model 212. Furthermore, content providers were previously unable to assess the true value of initial engagement campaigns because subsequent attributions, such as those occurring directly after a different interaction, were not reported to the initial engagement models. The method 200 allows for initial engagement model 212 to account for these subsequent interactions, which were previously uncollected, or lost data.

In some implementations, activity processor 202 analyzes a timestamp of the initiation action to determine whether the action has occurred within a predetermined period of time of the occurrence of the specified action detected in step A. For example, activity processor 202 may determine, using the interaction data, that the initiation action occurred more than 30 days before the specified action. Activity processor 202 may exclude an initiation action if it occurred outside of a predetermined period of time of the occurrence of the specified action to account for diminishing effects of the initiation action on a user's actions. In these situations, activity processor 202 may not generate an instance of attribution for the initiation action. For example, activity that has occurred more than a threshold amount of days may have occurred too long ago to have affected a user's actions, while activity that occurred within a threshold amount of days but before the last-in-time action may still have had an effect. By imposing a threshold number of days, the system lessens the likelihood of attributing an action to activity that was unlikely to have had an effect on a user's actions while still including activity that is usually not considered or even recorded. For example, a suggestion to a user to download a navigation application that was provided two years ago may not have much of an influence over the user's decision to enter a review for a clothing store within the application in the present, but a suggestion to the user to download a navigation application last week may have an effect on the user's decision to use the application to search for the nearest taco place in the present, and that effect may not be accounted for or even recorded by existing methods.

The method 200 continues with step D in which action database 208 propagates the instances of attribution to re-engagement model 210 and initial engagement model 212. These instances of attribution are used as input to re-engagement model 210 and initial engagement model 212 to improve the models. For example, action database 208 can provide the instances of attribution to re-engagement model 210 and initial engagement model 212 as positive examples of campaigns that were effective such that the models 210 and 212 learn from the examples. The re-engagement model 210 and initial engagement model 212 each trains on this data to improve future predictions of either user re-engagement or initial user engagement, respectively.

The method 200 continues with step E in which action database 208 propagates the instances of attribution to user interface generator 214. User interface generator 214 can then generate a visual representation of the data provided. For example, user interface generator 214 can generate a user interface element highlighting the data provided. In some implementations, user interface generator 214 can represent the attribution associated with the initiation action differently from the attribution associated with the last action.

By highlighting the data that is newly collected and/or analyzed, the data is made more visible so that users who see the data can easily distinguish the new data from data that was previously collected and used. In some implementations, the system can report the new data separately within a reporting user interface such that the new attribution data associated with an initiation action is visually distinct and separate from the attribution data associated with the last-in-time action.

Figure 3:
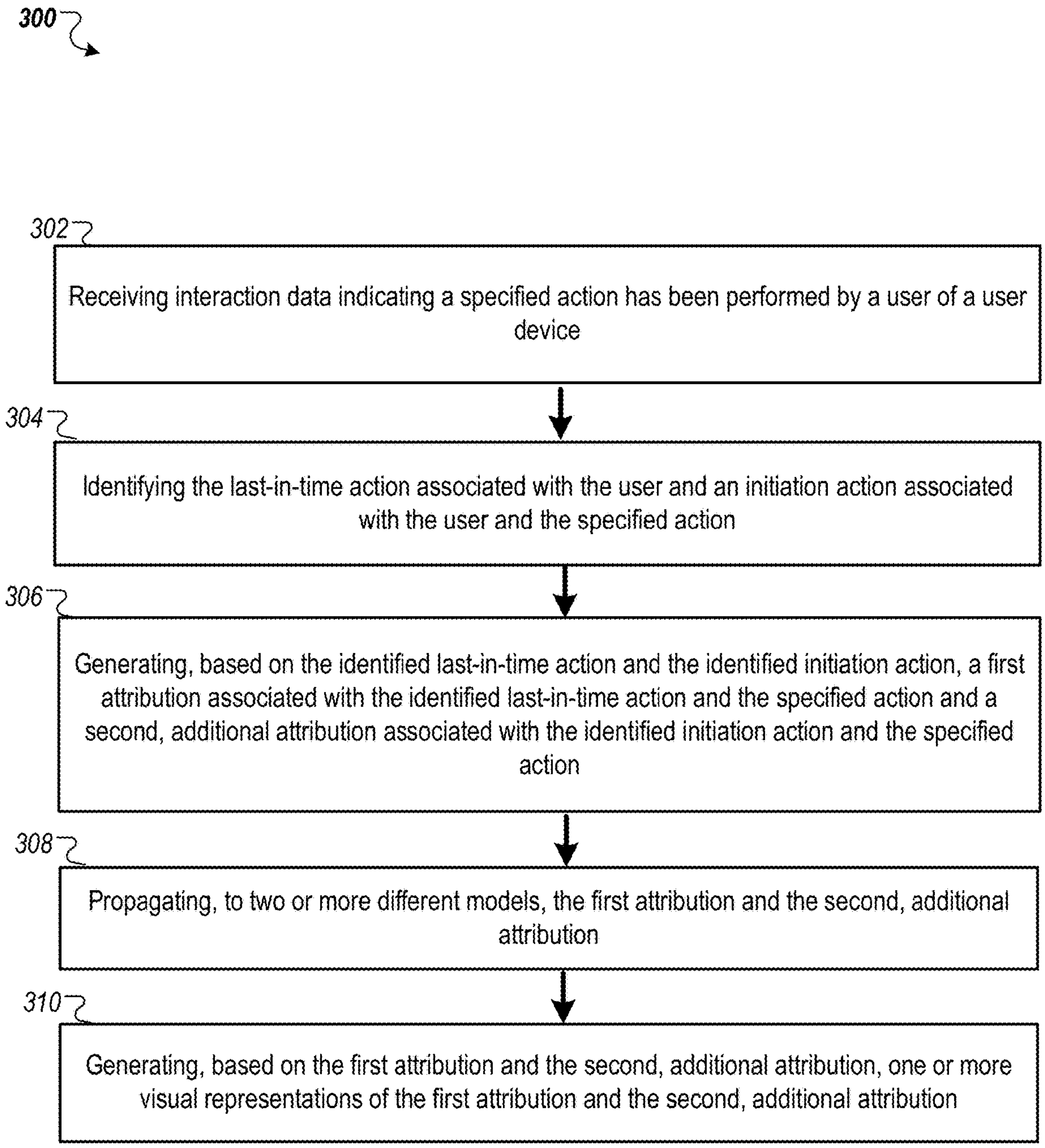
FIG. 3 is a flow diagram of an example method for improving data integrity in modelling for data collection and analysis.

FIG. 3 is a flow diagram of an example method 300 for improving data integrity in modelling for data collection and analysis. In some implementations, method 300 can be performed by one or more systems. For example, method 300 can be implemented by DCDS 110, activity processor 202, last interaction database 204, initiation interaction database 206, action database 208, re-engagement model 210, initial engagement model 212, and user interface generator 214 of FIGS. 1-2. In some implementations, the process 300 can be implemented as instructions stored on a computer readable medium which may be non-transitory, and when the instructions are executed by one or more servers, the instructions can cause the one or more servers to perform operations of the process 300.

Method 300 begins with receiving, by one or more processors, interaction data indicating a specified action has been performed by a user of a user device (302). For example, activity processor 202 can receive interaction data indicating that a specified action was performed by a user of user device 106. The specified action can include, for example, providing user input through a user interface element or downloading and installing an application on the user device.

Method 300 continues with identifying, by the one or more processors, the last-in-time action associated with the user and an initiation action associated with the user and the specified action (304). For example, activity processor 202 can identify and receive data indicating the last-in-time action—a click on a link to a suggested news article that is associated with the user, and an initiation action—a click on a link to download and install a news application on user device 106 that is associated with the user and the specified action—providing a comment on a news article through a user interface element.

In some implementations, identifying the last-in-time action associated with the user and the initiation action associated with the user and the specified action comprises querying one or more interaction databases. For example, activity processor 202 can query last interaction database 204 and/or initiation interaction database 206 to identify the last-in-time action associated with the user and the initiation action associated with the user and the specified action.

Method 300 continues with generating, by the one or more processors and based on the identified last-in-time action and the identified initiation action, a first attribution associated with the identified last-in-time action and the specified action and a second, additional attribution associated with the identified initiation action and the specified action (306). For example, activity processor 202 can generate a first attribution associated with the last-in-time action and the specified action and a second attribution associated with the initiation action and the specified action.

In some implementations, activity processor 202 generates the second attribution in response to determining that the identified initiation action occurred within a predetermined period of time prior to the specified action. For example, activity processor 202 can generate the second attribution in response to determining that the identified initiation action occurred less than two weeks prior to the specified action occurring.

Method 300 continues with propagating, by the one or more processors and to two or more different models, the first attribution and the second, additional attribution (308). For example, action database 208 can propagate the two attributions to re-engagement model 210 and to initial engagement model 212 independently.

Method 300 continues with generating, by the one or more processors and based on the first attribution and the second, additional attribution, one or more visual representations of the first attribution and the second, additional attribution (310). For example, user interface generator 214 can generate visual representations of the two attributions.

In some implementations, the one or more visual representations comprise a first visual representation of the first attribution and a second, different visual representation of the second, additional attribution. For example, user interface generator 214 can generate separate visual representations of the first attribution and the second, different attribution.

In some implementations, the second, different visual representation of the second, additional attribution is visually distinct from the first visual representation of the first attribution. For example, the visual representations can have different colors, fonts, text size, media types (e.g., video vs. image), and/or audio, among other features.

Figure 4:
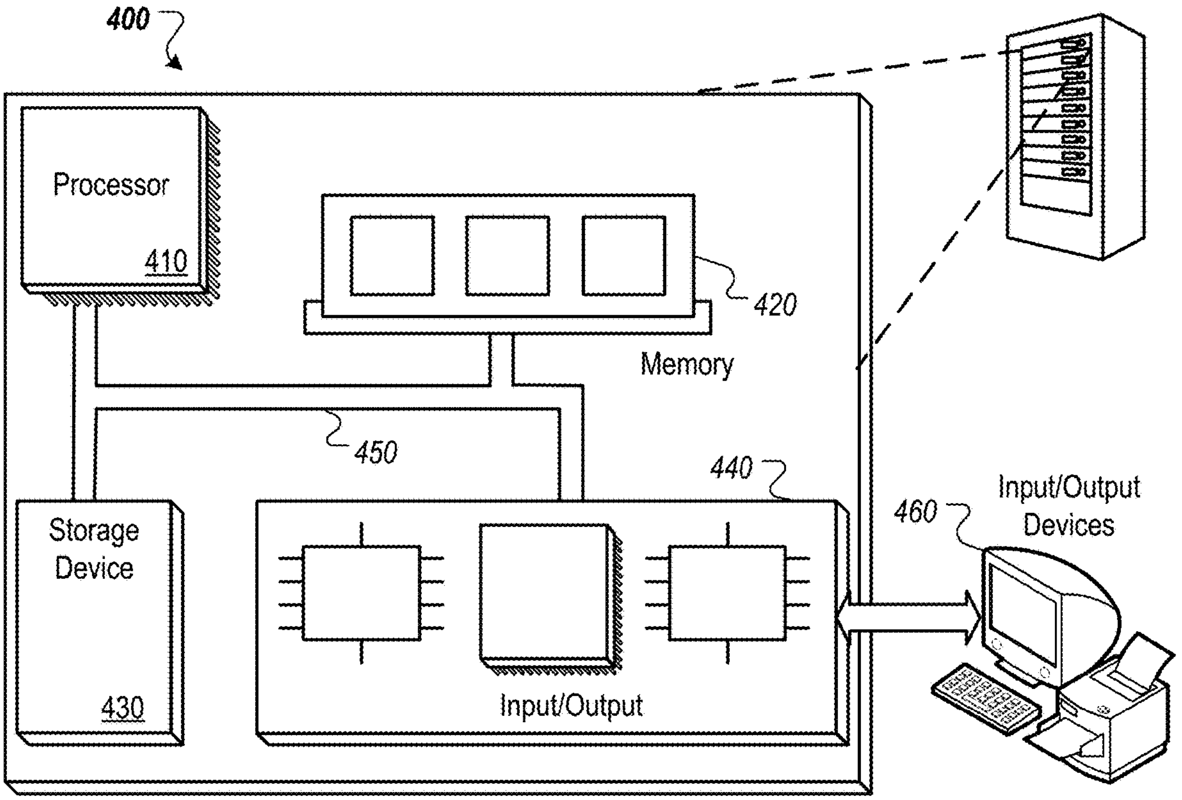
FIG. 4 is a block diagram of an example computer system.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Media does not necessarily correspond to a file. Media may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:

receiving, by one or more processors, interaction data indicating a performance of a specified action by a user of a user device, the specified action being an action (i) specified by an entity and (ii) performable by users;

identifying, by the one or more processors, (i) a last-in-time action associated with the user and (ii) an initiation action associated with the user and the specified action;

generating, by the one or more processors and based on the identified last-in-time action and the identified initiation action, (i) a first attribution for the identified last-in-time action for the performance of the specified action and (ii) a second attribution for the identified initiation action for the performance of the specified action;

training, by the one or more processors, two or more different models based on the first attribution and the second attribution, wherein a first model of the two or more different models is configured to predict likelihoods of users performing specified actions and a second model of the two or more different models is configured to predict likelihoods of users performing initiation actions, the training comprising using both the first and second attributions as training data in both the first and second models;

generating, by the one or more processors using the two or more different models including the first model and the second model, at least one of (i) a first predicted likelihood that one or more first users will perform a specified action associated with a given digital component and (ii) a second predicted likelihood that one or more second users will perform an initiation action for the given digital component; and distributing, by the one or more processors, the digital component to at least one of the one or more users based on at least one of (i) the first predicted likelihood or the second predicted likelihood for each of the one or more users.

2. The computer-implemented method of claim 1, wherein the first model comprises a first trained machine learning model and the second model comprises a second trained machine learning model.

3. The computer-implemented method of claim 1, wherein the identified initiation action comprises downloading an application.

4. The computer-implemented method of claim 3, wherein the specified action comprises an action performed using the application.

5. The computer-implemented method of claim 1, wherein the first model is trained to predict the likelihoods of users performing specified actions based on actions performed by a set of users after the set of users performed corresponding initiation actions.

6. The computer-implemented method of claim 1, wherein the second model is trained to predict the likelihoods of users performing initiation action based on actions performed by users prior to performing the initiation actions.

7. The computer-implemented method of claim 1, further comprising generating one or more visual representations based on the first attribution and the second attribution.

8. The computer-implemented method of claim 1, wherein:

the last-in-time action is a most recent action that is (i) related to the specified action and (ii) performed by the user prior to performance of the specified action by the user; and the initiation action is an action that was performed by the user prior to the last-in-time action and is determined to have led to a download of an application with which the specified action occurred.

9. A system comprising:

one or more processors; and one or more memory elements including instructions that, when executed, cause the one or more processors to perform operations comprising:

receiving interaction data indicating a performance of a specified action by a user of a user device, the specified action being an action (i) specified by an entity and (ii) performable by users;

identifying (i) a last-in-time action associated with the user and (ii) an initiation action associated with the user and the specified action;

generating, based on the identified last-in-time action and the identified initiation action, (i) a first attribution for the identified last-in-time action for the performance of the specified action and (ii) a second attribution for the identified initiation action for the performance of the specified action;

training two or more different models based on the first attribution and the second attribution, wherein a first model of the two or more different models is configured to predict likelihoods of users performing specified actions and a second model of the two or more different models is configured to predict likelihoods of users performing initiation actions, the training comprising using both the first and second attributions as training data in both the first and second models;

generating, using the two or more different models including the first model and the second model, at least one of (i) a first predicted likelihood that one or more first users will perform a specified action associated with a given digital component and (ii) a second predicted likelihood that one or more second users will perform an initiation action for the given digital component; and distributing the digital component to at least one of the one or more users based on at least one of (i) the first predicted likelihood or the second predicted likelihood for each of the one or more users.

10. The system of claim 9, wherein the first model comprises a first trained machine learning model and the second model comprises a second trained machine learning model.

11. The system of claim 9, wherein the identified initiation action comprises downloading an application.

12. The system of claim 11, wherein the specified action comprises an action performed using the application.

13. The system of claim 9, wherein the first model is trained to predict the likelihood of users performing specified actions based on actions performed by a set of users after the set of users performed corresponding initiation actions.

14. The system of claim 9, wherein the second model is trained to predict the likelihoods of users performing initiation action based on actions performed by users prior to performing the initiation actions.

15. The system of claim 9, wherein the operations comprise generating one or more visual representations based on the first attribution and the second attribution.

16. A non-transitory computer storage medium encoded with instructions that when executed by one or more computers cause the one or more computers to perform operations comprising:

receiving, by one or more processors, interaction data indicating a performance of a specified action by a user of a user device, the specified action being an action (i) specified by an entity and (ii) performable by users;

identifying, by the one or more processors, (i) a last-in-time action associated with the user and (ii) an initiation action associated with the user and the specified action;

generating, by the one or more processors and based on the identified last-in-time action and the identified initiation action, (i) a first attribution for the identified last-in-time action for the performance of the specified action and (ii) a second attribution for the identified initiation action for the performance of the specified action;

training, by the one or more processors, two or more different models based on the first attribution and the second attribution, wherein a first model of the two or more different models is configured to predict likelihoods of users performing specified actions and a second model of the two or more different models is configured to predict likelihoods of users performing initiation actions, the training comprising using both the first and second attributions as training data in both the first and second models;

generating, by the one or more processors using the two or more different models including the first model and the second model, at least one of (i) a first predicted likelihood that one or more first users will perform a specified action associated with a given digital component and (ii) a second predicted likelihood that one or more second users will perform an initiation action for the given digital component; and distributing, by the one or more processors, the digital component to at least one of the one or more users based on at least one of (i) the first predicted likelihood or the second predicted likelihood for each of the one or more users.

17. The non-transitory computer storage medium of claim 16, wherein the first model comprises a first trained machine learning model and the second model comprises a second trained machine learning model.

18. The non-transitory computer storage medium of claim 16, wherein the identified initiation action comprises downloading an application.

19. The non-transitory computer storage medium of claim 18, wherein the specified action comprises an action performed using the application.

20. The non-transitory computer storage medium of claim 16, wherein the first model is trained to predict the likelihood of users performing specified actions based on actions performed by a set of users after the set of users performed corresponding initiation actions.

* * * * *